United States Patent [19]

Davis et al.

[11] Patent Number: 4,539,552

[45] Date of Patent: Sep. 3, 1985

[54] DIGITAL-TO-ANALOG CONVERTER

[75] Inventors: Paul C. Davis, Reading, Pa.; Raymond G. Jackson, Indianapolis, Ind.; Joseph J. Nahas, Wyomissing, Pa.; Dale H. Nelson, Cumberland, Ind.; DeWitt G. Ong, Tempe, Ariz.; Brian A. Wittman, Indianapolis, Ind.

[73] Assignee: AT&T Bell Laboratories, Murray Hill, N.J.

[21] Appl. No.: 416,609

[22] Filed: Sep. 10, 1982

Related U.S. Application Data

[60] Continuation of Ser. No. 207,750, Nov. 17, 1980, abandoned, which is a division of Ser. No. 103,403, Dec. 13, 1979, Pat. No. 4,352,958.

[51] Int. Cl.³ .............................................. H03K 13/02
[52] U.S. Cl. ............................................ 340/347 DA
[58] Field of Search ................. 340/347 DA, 347 AD

[56] References Cited

U.S. PATENT DOCUMENTS

| | | | |
|---|---|---|---|
| 3,290,671 | 12/1966 | Lamoureux | 340/347 DA |
| 3,474,440 | 10/1969 | Schmid | 340/347 DA |
| 3,581,303 | 5/1971 | Kelly | 340/347 DA |
| 3,685,045 | 8/1972 | Pastoriza | 340/347 DA |
| 3,714,599 | 1/1973 | Cecil | 340/347 DA |
| 3,717,777 | 2/1973 | Cecil | 340/347 DA |
| 3,961,326 | 6/1976 | Craven | 340/347 DA |
| 4,184,151 | 1/1980 | Iwata | 340/347 AD |

OTHER PUBLICATIONS

Baum, "IBM Technical Disclosure Bulletin", vol. 12, No. 1, Jun. 1969, p. 82.

Primary Examiner—Charles D. Miller
Attorney, Agent, or Firm—Samuel R. Williamson

[57] ABSTRACT

A digital-to-analog signal converter (1000) provides an analog output signal by subtracting bit currents reflecting a digital input signal from a constant current source (1004, 1018–1022) at a current summer (1003), with the difference current being applied to a constant load. The subtracting of the current, rather than switching the current, avoids the modulation of an associated power source since the total current demand remains the same. In that low power operation is possible, the converter is particularly suited for use in an arrangement where only a low level of operating current is available from a power source.

6 Claims, 16 Drawing Figures

DIGITAL-TO-ANALOG CONVERTER

This application is a continuation of application Ser. No. 207,750, now abandoned, filed Nov. 17, 1980, which is a divisional under 37 CFR 1.60 of allowed application Ser. No. 103,403, filed Dec. 13, 1979, now U.S. Pat. No. 4,352,958.

TECHNICAL FIELD

This invention relates to multifrequency signal generators that provide tone signaling and, more particularly, to switching circuitry and control circuitry of such generators.

BACKGROUND OF THE INVENTION

Various multifrequency signal generators have been proposed and used heretofore in telephone dials employing electronic switching wherein the common switching functions are performed by solid-state circuit elements. The use of electronic switching is consistent with the current direction of telephone development which points toward a substantially fully integrated set employing monolithic circuit techniques. The electronic switching is thus replacing mechanical switches found in prior art dials and thereby exploiting modern circuit technology with its increased reliability and decreased cost.

In disconnecting the transmitter and muting the receiver during dialing, the mechanical common switches of the prior art dials simply make and break appropriate signal paths. In that the series resistance of the mechanical switch is essentially zero in the ON condition, these switches connect the transmitter and receiver to their respective matching loads with no loss of signal level or change of impedance.

The multifrequency signal generators in telephone dials having electronic switching generally duplicate the mechanical switching functions with active devices such as transistors. But these devices are lossy elements when in the ON condition (saturated mode) having a finite series resistance that becomes an important consideration on long loops with corresponding low loop current conditions. In an effort to overcome this disadvantage, it has been proposed that the ON resistance be minimized through enlargement of the area of the switching transistor on the integrated circuit. This, however, would make the common switch a disproportionately large area of the integrated circuit without further benefit other than the reduced resistance. In fact, there is always some minimal irreducible loss associated with the saturated transistor switch. Moreover, the transistor switch has a dc voltage drop that reduces the current in the transmitter which, in turn, means lower output signal since the transmitter is a variable resistance element.

SUMMARY OF THE INVENTION

In the present invention, a multifrequency generator having electronic switching avoids the signal loss associated with solid-state devices, such as transistors being used as switches in the saturated condition. Better signal transfer is provided to the transmit and receive transducers of a telephone set by improving the transducer's impedance match to their respective loads. In addition, the solid-state switches are arranged in a gain configuration to increase the level of the speech signal.

Included in the multifrequency generator are two oscillators. A stable high-frequency reference oscillator combines with countdown circuitry to generate the appropriate signaling tone pair frequencies for a tone signaling telephone dial. This oscillator only has power during dialing. A second stable oscillator of a lower frequency and power serves as an event timer oscillator and provides the reference for the timing of common events within the multifrequency generator. In accordance with the invention, a logic control circuit responsive to the event timer oscillator provides for both button-down and button-up debouncing of a contact closure signal from a crosspoint keypad. The control circuit also sequences the muting of the receive transducer and the disconnecting of the transmit transducer to prevent switching transients of the transmit transducer from being annoying to a user. When a contact closure has been verified, the control circuit provides for the generation of tone for a minimum of 50 milliseconds.

A high and a low frequency synthesizer each provides a binary signal for a four-level synthesized waveform in the production of tone signals. Summed and converted to analog levels in a digital-to-analog converter, the generated waveforms are then applied to a filter and line driver circuit that removes undesirable harmonics and provides a signal to the telephone line.

A power supply in the multitone frequency generator provides a constant current over a wide voltage range to ensure constant operating performance and reduced spurious signals. Capable of generating multitone signals on as little as 17 milliamps, the multifrequency generator can also maintain a speech path as low as 5 milliamps, such as could be the case when multiple telephones are connected on a long loop.

DETAILED DESCRIPTION

Figure 1:
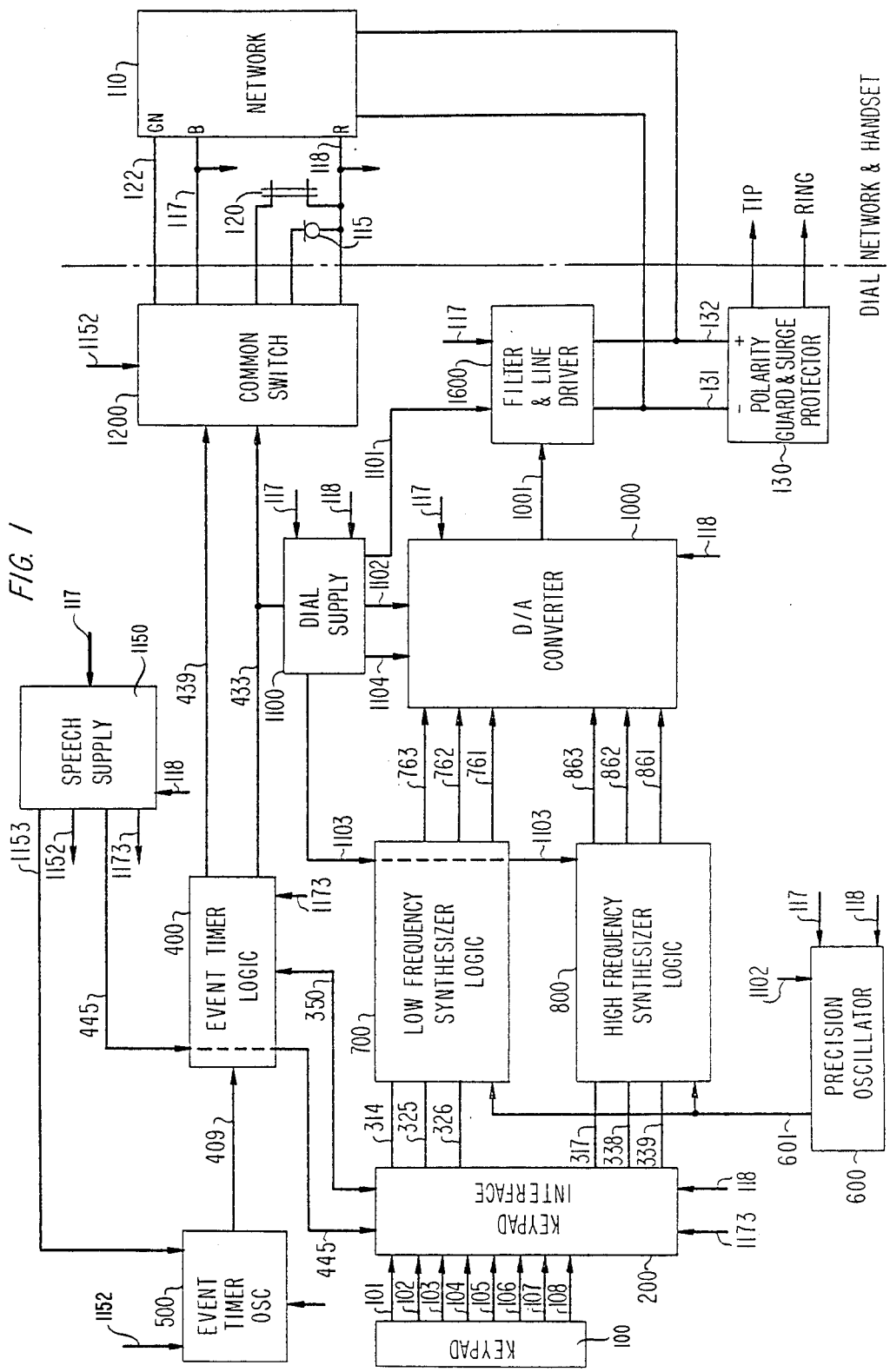
FIG. 1 is a block diagram showing the major functional components of the electronically-switched multifrequency generator and their general interaction with each other.

FIG. 1 is a functional block representation of an electronically-switched multifrequency generator in a telephone set operative in accordance with the principles of the invention. The multifrequency generator has two modes of operation, a speech mode and a dial mode. In the speech mode, a signal path exists between both a transmit transducer 115 and a receive transducer 120, and the telephone tip and ring lines. In the dial mode, tone generated signals reflective of a digit entered on a keypad 100 are presented to the tip and ring lines. The quiescent state of the multifrequency generator is in the speech mode. The generator changes to the dial mode whenever a digit is entered by operating a contact on the keypad 100. The circuit components that provide for the transmission of the speech signals and the tone generated signals to the tip and ring lines are best presented in terms of their operation in the dial and speech modes.

The four-row four-column keypad 100 has a crosspoint contact array with a metallic contact closure capability between each row and column. Entering a digit on the keypad 100 provides an activation signal to a keypad interface 200 which encodes each of the four column inputs from the keypad 100 into a two-bit code. Transmitted over the lines 338 and 339 to a high-frequency synthesizer logic 800, the encoding signal is then used by the high-frequency synthesizer logic 800 in generating a binary signal representing one of four possible tones.

If more than one column input is activated, the keypad interface 200 provides an inhibit signal over the line 317 to the high-frequency synthesizer logic 800 so that the synthesizer will not produce the binary signal representative of a high group tone. The keypad interface 200 similarly encodes each of the four row inputs from the keypad 100 into a two-bit code that is transmitted over the lines 325 and 326 to a low-frequency synthesizer logic 700. If more than one row input from the keypad 100 is activated, the keypad interface provides an inhibit signal over the line 314 to the low-frequency synthesizer logic 700. A stable time reference for the high and low frequency synthesizers is provided by an RC oscillator circuit 600 having a nominal frequency of 160 kHz.

The keypad interface 200 also couples the activation signal from the keypad 100 to an event timer logic 400 over the line 350. This logic section controls the orderly sequence of events internal to the multifrequency generator circuit. From the time reference obtained by an event timer oscillator 500, the event timer logic 400 determines whether or not a button push on the keypad 100 is of sufficient duration to be considered valid. It also provides sequence control signals to a common switch circuit 1200 over the lines 433 and 439. Finally, it determines a valid button release and provides the timing for a 50 millisecond minimum tone burst signal.

The signals from the two synthesizer logics are combined in a digital-to-analog converter 1000 which generates the sum of the selected low and the selected high group tones. The digital-to-analog converter 1000 also maintains a constant quiescent output level when in the dial mode even if only one tone or no tone is being generated. A no-high-group-tone condition occurs if the keypad interface 200 provides an inhibit signal over the line 317 to the high-frequency synthesizer logic 800. The digital-to-analog converter 1000 does not generate a high group tone, but instead provides a dc level representing the average signal level of a high group tone. Similarly, the signal from the keypad interface 200 to the low-frequency synthesizer logic 700 over the line 314 causes the digital-to-analog converter 1000 to perform in the same manner. The output of the digital-to-analog converter 1000 is used to drive a filter and line driver circuit 1600 which reduces the harmonics in the tones and provides the proper tone output level at the telephone's tip and ring lines.

The common switch circuit 1200 uses the information generated by the event timer logic 400 and transmitted over the lines 433 and 439 to disable the transmit transducer and attenuate the signal to the receive transducer, respectively in the dial mode. The signal on line 433 is also used to turn on a dial supply 1100. The dial supply 1100, in turn, activates the digital-to-analog converter 1000 and the filter and line drive circuit 1600. Also activated by the dial supply 1100 are the low and high frequency synthesizer logics and the oscillator circuit 600.

In the speech mode a speech supply 1150 provides a reference current for powering the event timer oscillator 500, the event timer logic 400, the keypad interface 200, and the common switch circuit 1200. These circuit sections within the multifrequency generator circuit are those which remain active while the generator is in the speech mode. Also in this state, the common switch circuit 1200 amplifies the transmit and receive speech signals.

A polarity guard and surge protection circuit 130 ensures that the correct polarity is maintained on the circuit components irrespective of the voltage polarity present on the tip and ring lines and that no high voltage surge on these lines is allowed to be impressed on the generator circuitry causing damage thereto. Connected between the common switch circuit 1200 and the polarity guard and surge protection circuit 130 is a network 110 that separates incoming and combines outgoing transmit and receive speech signals.

Figure 2:
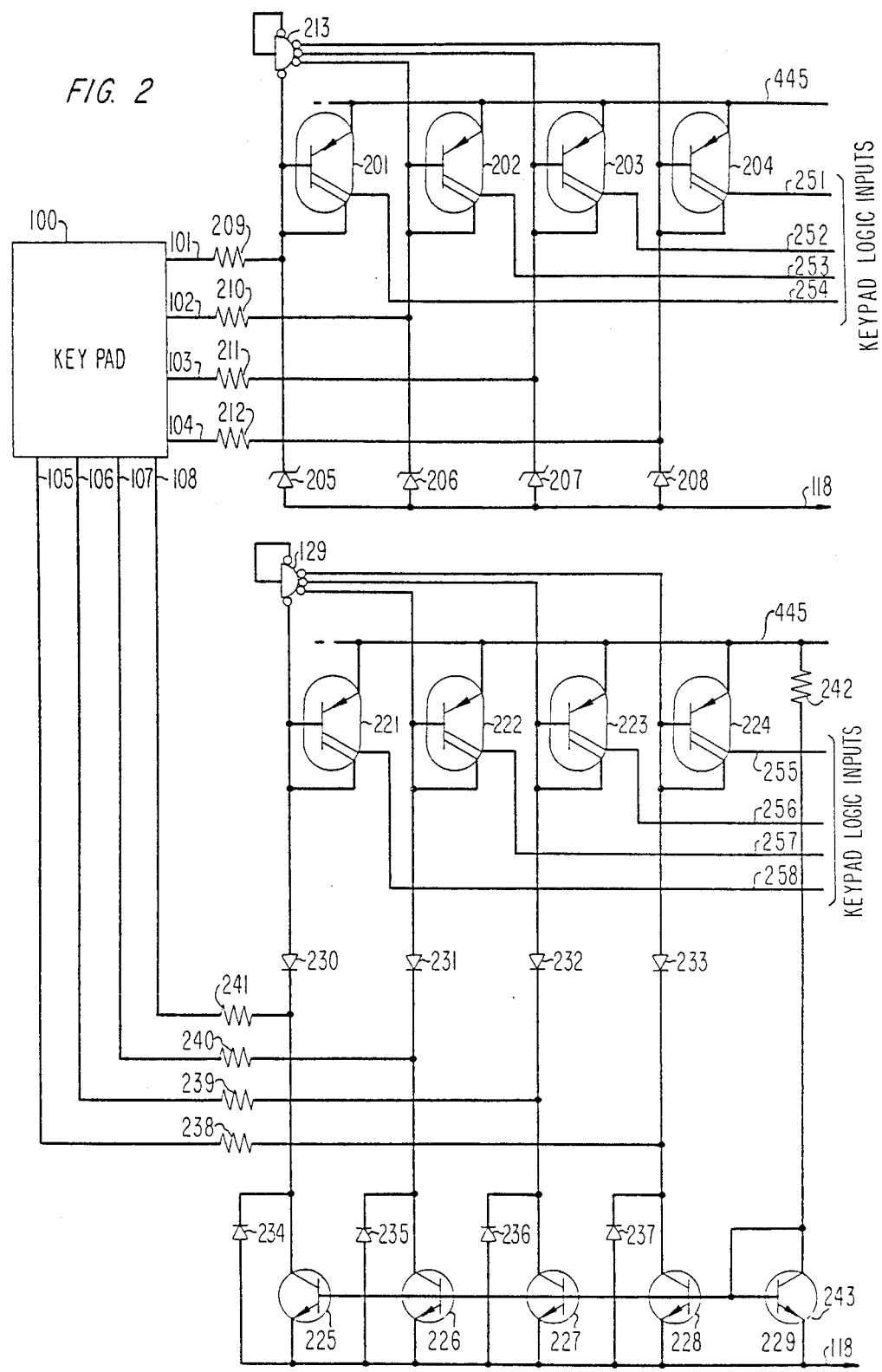
FIG. 2 is a detailed schematic of the keypad detector circuitry employed in this invention.

Referring to FIG. 2, a keypad detector circuit, contained within the keypad interface 200 of FIG. 1, connects to the crosspoint keypad 100 which has 16 switches and eight leads 101 through 108. Each switch represents a separate button on the keypad 100. The eight leads are divided into four row output leads and four column output leads. In interfacing with the keypad 100, the keypad detector circuit is divided into four identical low group sections and four identical high group sections. The low group sections comprise transistors 201 through 204, diodes 205 through 208, resistors 209 through 212, and NAND gate 213. The high group sections comprise transistors 221 through 228, diodes 230 through 237, and resistors 238 through 241. Each low and high group section is responsive to the closure of a switch on the keypad which is representative of a particular row and column therein. Resistor 242 and transistor 243 provide the reference current for four current sources generated by transistors 225 through 228. These current sources drive transistors 221, 222, 223, and 224 through diodes 230, 231, 232, and 233, respectively. With the switch connections in the keypad open, transistors 221, 222, 223, and 224 are all turned on.

If a keypad closure is made, for example, between the collector of transistor 228 and the base of transistor 201, the current from transistor 228 is diverted from the series diode 233 and transistor 224 to transistor 201. The voltage required to turn on transistor 201 is one voltage drop ($V_{BE}$) while the voltage required to turn on transistor 224 is approximately twice this value because of the diode 233. Thus, upon the closure of the switch, transistor 224, representing one of four identical high group circuits, is turned off and transistor 201, representing one of four identical low group circuits, is turned on. This indicates that the switch closure is in row 1 and column 1.

Figure 3:
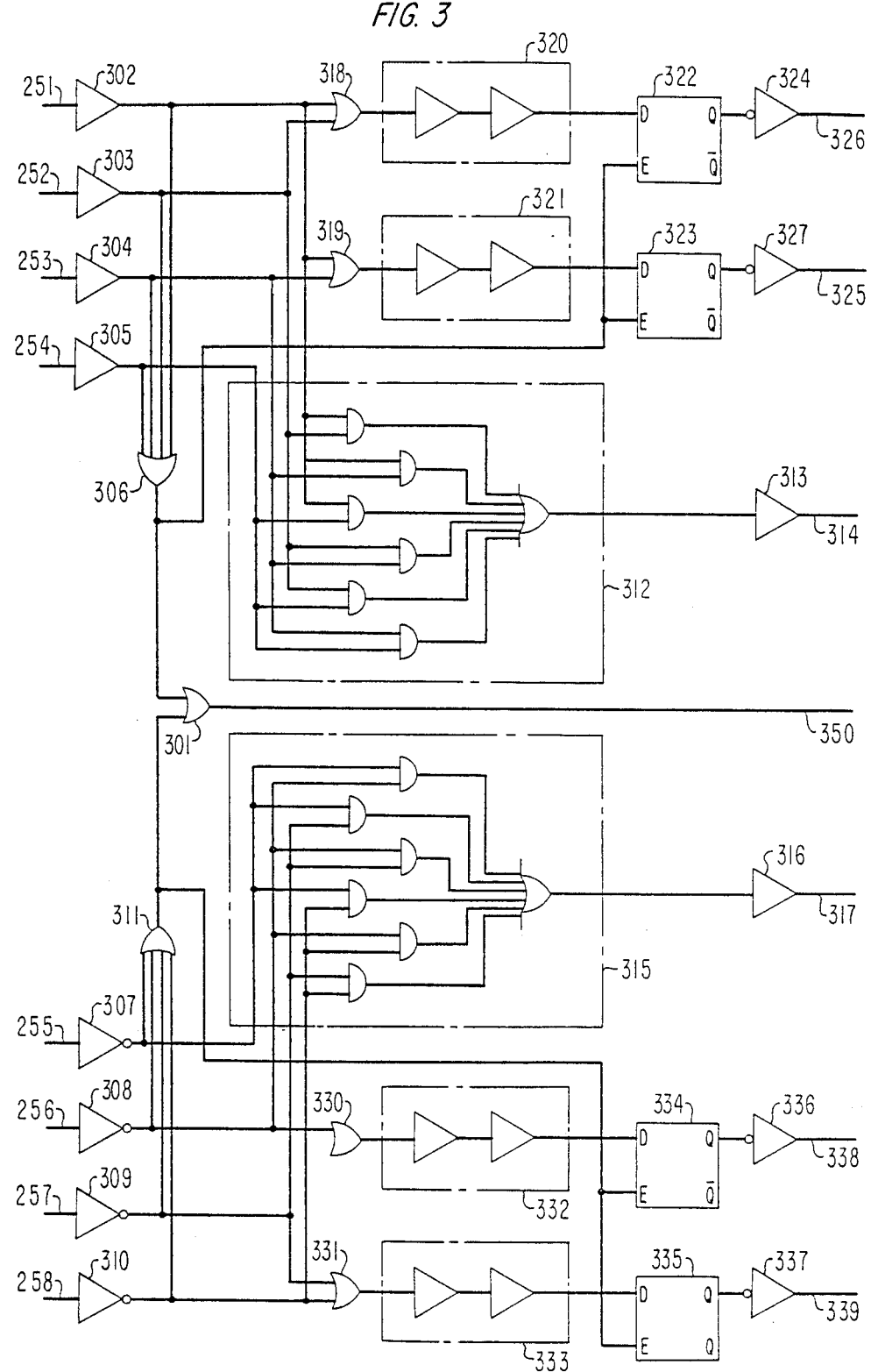
FIG. 3 is a detailed schematic of the keypad logic circuitry employed in this invention.

Another part of the keypad interface 200 of FIG. 1 is the keypad logic circuit shown in FIG. 3. The output of the keypad detector circuit lines 251–254 and 255–258 comprises the input to the keypad logic circuit. The keypad logic circuit is divided into low and high groupings forming two essentially identical circuits, the difference being the low group inputs from the keypad detector circuit are normally off and turn on when a button is pushed while the high group inputs are normally on and turn off when a button is pushed. Thus, the high group inputs are inverted with respect to the low group inputs.

The switch closure output signal on the line 350 is generated to indicate to an event timer logic 400, to be later discussed, that a button on the keypad 100 has been pushed. The switch closure output signals is formed by ORing of the output of OR gates 306 and 311 in gate 301. The signals on lines 251 through 254 are buffered by gates 302 through 305, respectively. The output of these gates are ORed together in gate 306 to form a low button push output signal. Similarly, the signals on lines 255 through 258 are buffered and inverted by gates 307 through 310, respectively, and are ORed together in gate 311 to form a high button push output signal.

A low group multiple input detector section 312 checks the six possible pair combinations of the low group input signals to determine if more than one is at a logic one which indicates the active state. If two or more are active, the low group multiple input detector section 312 provides the appropriate signal through a buffer 313 and over the line 314 to the low-frequency synthesizer logic 700, discussed later. Similar to the low group multiple input detector section, a high group multiple input detector section 315 checks the six possible pair combinations of the high group input signals to determine if more than one is at a logic one which indicates the active state. If two or more are active, the high group multiple input detector section 315 provides the appropriate signal through a buffer 316 and over the line 317 to the high-frequency synthesizer logic 800, also discussed later. The encoding scheme of the low and high group signals thus assumes that there is only one valid input permissible from the low and high group signals at any one time.

The encoded low group signals are coupled through NOR gates 318 and 319 and through separate four gate delay sections 320 and 321 to latches 322 and 323. The outputs of latches 322 and 323 are buffered by gates 324 and 327, respectively, to provide a drive signal over lines 326 and 325 to the low-frequency synthesizer logic 700. The encoded high group signals are coupled through NOR gates 330 and 331 and through separate four gate delay sections 332 and 333 to latches 334 and 335. Gates 336 and 337 respectively buffer the output signals from latches 334 and 335 and provide a drive signal over lines 338 and 339 to the high-frequency synthesizer logic 800. As long as any input from the low or high group is activated, the button push signal for that group opens the appropriate latches to the encoded keypad signal by providing an activation signal to the enable input of the latches. If all buttons are released, the activation signal is removed and the latches retain the decoded information present therein. The additional time provided by the four gate delays guarantees that the information will be latched before it is lost.

Figure 4:
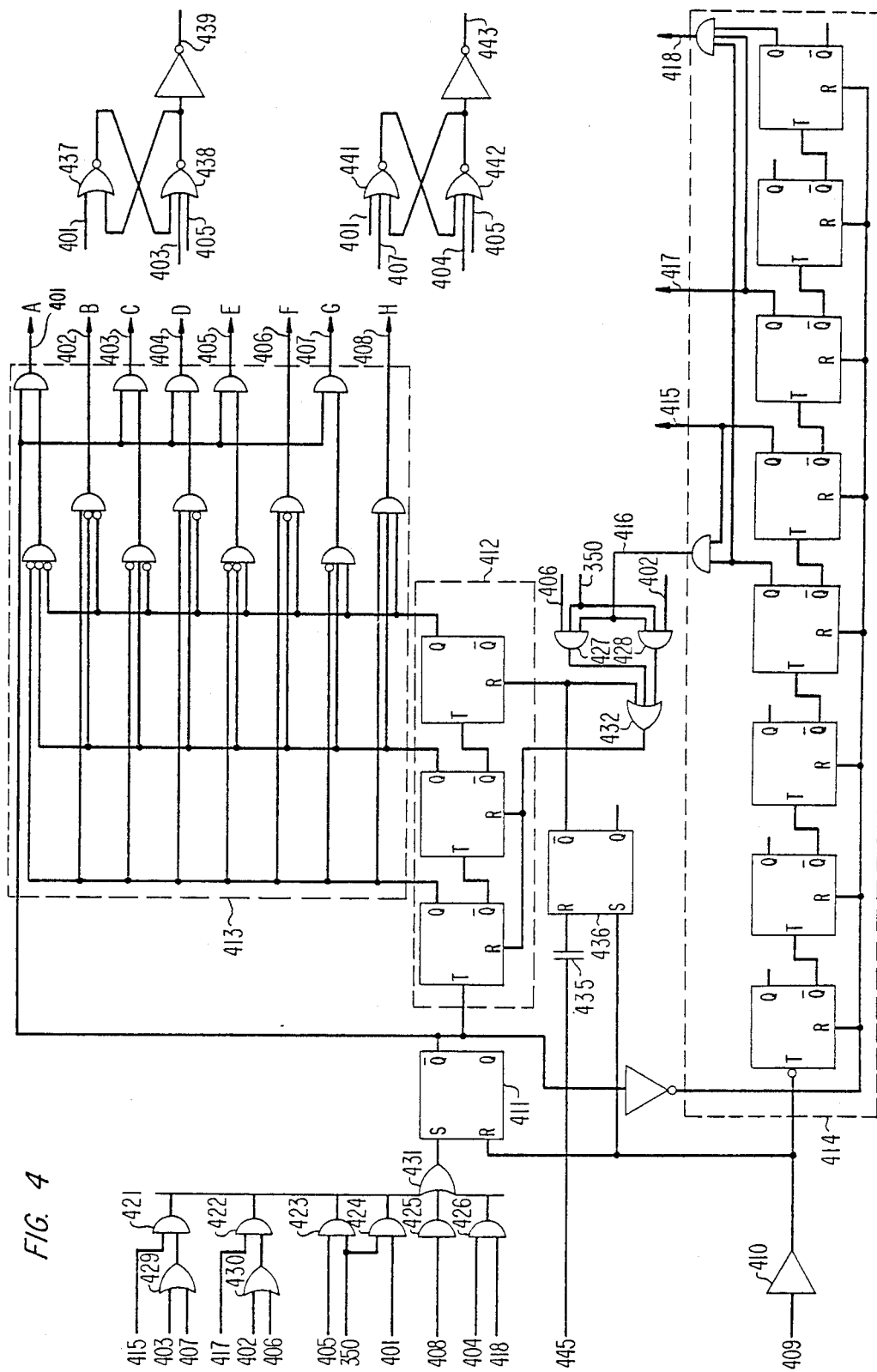
FIG. 4 is a detailed schematic of the event timer logic circuitry employed in this invention.

The event timer logic 400, shown in FIG. 4, controls the orderly sequence of events internal to the multifrequency signal generator. The event timer logic 400 has as its inputs signals from the event timer oscillator 500, to be described later, which provides a time base, and the keypad interface 200 which determines if a button on the keypad 100 has been pushed. Operation of the event timer logic 400 is best understood by dividing a button push cycle into eight intervals represented by and referenced on FIG. 4 as the letters A through H, the signals occurring on lines 401 through 408. Each interval has a unique part in the orderly progression of events involved in a complete button push cycle. Broadly described, the button push cycle is the sequence of waiting for a button push to occur, the pushing of a button, the release of the button, and the waiting for the next push to occur. More specifically, it is the following intervals.

Interval A: In this interval, the logic is in its quiescent state waiting for a button push to occur and the multifrequency generator is in the speech mode.

Interval B: This is the button push validation interval which consists of two subintervals. The first subinterval is defined as waiting twenty-four counts of the event timer oscillator amounting to approximately six milliseconds. The second subinterval is defined as an additional eight counts (approximately two milliseconds) in which the button push signal on line 350 must be continuously present. If not continuously present, the logic immediately reverts back to interval A and waits for the button push signal to reoccur. During interval B the multifrequency generator remains in the speech mode.

Interval C: This interval provides the time separation of the receiver mute and transmitter mute functions. The receiver 120 is muted at the beginning of the interval. The circuitry counts off sixteen periods of the event timer oscillator amounting to approximately four milliseconds before indexing to the next interval.

Interval D: This interval signals the transmitter 115 to be muted and tone generation to begin. The interval exists for one hundred sixty-eight counts (approximately forty-two milliseconds) wherein the multifrequency generator is considered to be in the dial mode.

Interval E: This interval is the wait-for-button-release interval in that as long as a button push is present, the circuitry remains in this interval and the multifrequency generator remains in the dial mode. As soon as the button release is detected, the logic is indexed to the next interval.

Interval F: This interval is the button release validation interval and is divided into two subintervals. In the first subinterval, the circuit counts off 24 periods (approximately six milliseconds) of the event timer oscillator. The next eight counts form the second subinterval wherein any detected button push signal immediately forces the logic back to interval E. The multifrequency generator is considered to be in the dial mode in this interval.

Interval G: This interval provides the time separation for the restoration of the transmitter 115 and the receiver 120. This is accomplished by restoring the transmitter at the beginning of this interval and waiting sixteen counts (approximately four milliseconds) before advancing to the next interval. Tone generation ceases when the transmitter is restored.

Interval H: This interval provides for the return of the logic back to interval A. One count of the event timer oscillator accomplishes this return. Interval A restores the receiver 120 and places the multifrequency generator in the speech mode.

A time reference for the event timer logic 400 is provided by the event timer oscillator 500 from which a signal is coupled over input line 409 through a driver 410 and an S-R flip-flop 411 to a three-bit event state counter 412. The three-bit output of the counter 412 provides the input to an event state decoder 413 which produces outputs 401 through 408. The event timer oscillator 500 also provides a time reference signal to an event timing counter 414 which, in turn, provides outputs at counts of 16, 24, 32, and 168 on lines 415 through 418, respectively.

An input signal from the keypad interface is provided over the line 350 and indicates if a button on the keypad 100 has been pushed. This button push signal and outputs from the event state decoder 413 and event timing counter 414 are combined in AND gates 421 through 428 and OR gates 429 through 432 to provide the appropriate timing for advancing the three-bit event state counter 412. The appropriate timing for each desired interval is gated to flip-flop 436 which resets the event timing counter 414 for the next interval. Capacitor 435 and R-S flip-flop 436 comprise an initiate circuit attached to the supply line 445 for ensuring that the event timer logic will be turned on with the logic coming up in the appropriate state.

NOR gates 437 and 438 receive interval outputs A, C, and E over lines 401, 403, and 405, respectively, from the event state decoder 413 and provide an output signal on line 439 which activates a receiver common switch section in the common switch 1200. Similarly, NOR gates 441 and 442 receive the interval outputs A, D, E, and G on lines 401, 404, 405, and 407, respectively, from the event state decoder and provide an output signal on line 443, for activating a transmitter common switching section in the common switch 1200. These output signals on lines 439 and 443 provide for sequencing of the transmitter 115 and the receiver 120 to avoid undesirable clicks occurring in the receiver. Thus, when a button is pushed indicating tone generation is desired, the receiver is muted and then the transmitter is disconnected. After the button is released, which indicates a return to the speech condition, the sequencing is reversed in that the receiver 120 is restored only after the transmitter 115 has been enabled. Actual tone generation occurs during the time transmitter 115 is disconnected.

Figure 5:
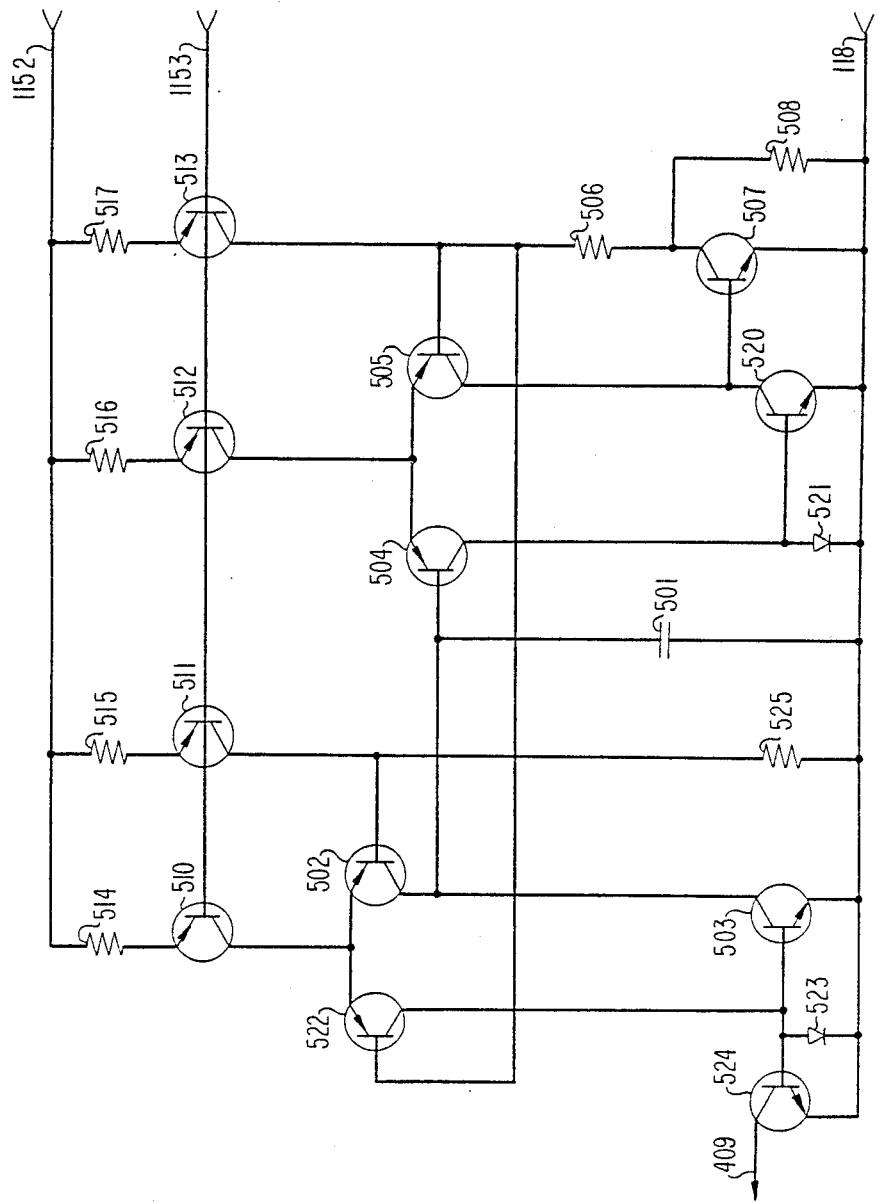
FIG. 5 is a detailed schematic of the event timer oscillator circuitry employed in this invention.

The event timer oscillator of FIG. 5 provides the timing for the event timer logic 400. The oscillator operates on the principle of charging and discharging a capacitor in a linear fashion with constant current sources connected in a complementary configuration. The ratio of the current sources in combination with a resistor and a capacitor set the frequency and duty cycle of the oscillator. A current mirror section comprising transistors 510 through 513 with respectively associated resistors 514 through 517 provide a source of constant current for the oscillator. Operating voltage is provided from the speech supply 1150 over line 1152 along with a reference bias on line 1153 for the current sources. Capacitor 501 is respectively charged and discharged by transistors 502 and 503 which comprise the charge and discharge current sources. A comparator formed by transistors 504 and 505 compares the capacitor voltage to a bilevel reference voltage on the base of transistor 505 formed by a current flowing through resistor 506 and the parallel combination of transistor 507 acting as a switch and resistor 508 from the current source transistor 513.

The operation of the oscillator is as follows. Assuming as a starting point that the voltage on capacitor 501 is lower than the reference voltage, then transistor 504 is in the on state and transistor 505 is turned off. Since transistor 504 is on, transistor 520 is also turned on by the voltage developed across diode 521. When transistor 520 is activated, transistor 507 is turned off thereby. As a result of transistor 507 being turned off, the current through resistor 506 flows only through resistor 508 providing a first voltage reference level on the base of transistor 505.

This voltage level is also coupled to the base of transistor 522 where it is compared to a third voltage reference level which is present on the base of transistor 502. This third voltage reference level is formed by a current flowing through resistor 525 from the current source transistor 511. By design the third voltage reference level is less than the first voltage reference level. Thus, in this instance, transistor 522 is off and transistor 502 is turned on. Since transistor 522 is in the off state, no current flows through diode 523. Therefore, transistors 524 and 503 are also turned off. In the meantime the current from the collector of transistor 502 is charging the capacitor 501. This charging continues until the capacitor voltage reaches a voltage equal to that on the base of transistor 505. An instant later the base-emitter junction of transistor 504 becomes less forward biased than the base-emitter junction of transistor 505, so transistor 504 starts to turn off, and transistor 505 starts to turn on. As transistor 504 starts to turn off, the reduced current through diode 521 causes transistor 520 to also turn off. This, in turn, will turn on transistor 507. As soon as transistor 507 starts to turn on, the potential on the base of transistor 505 drops to the second voltage reference level and turns transistor 505 on even harder. The voltage level at the base of transistor 505 is mainly determined by resistor 506 at this point due to the saturation of transistor 507.

This reduced voltage level on the base of transistor 505 is also coupled to the base of transistor 522. By design this second voltage reference level is less than the third voltage reference level on the base of transistor 502. This causes transistor 522 to turn on and transistor 502 to turn off. The current flowing from the collector of transistor 522 through diode 523 causes transistors 524 and 503 to turn on. Activation of transistor 503 provides a current path for discharging the capacitor 501. Capacitor 501 begins to discharge through transistor 503 and continues until its voltage drops to the level of that on the base of transistor 505. At this time transistor 505 turns off and transistor 504 turns on again, capacitor 501 starts charging, and the oscillation is repeated. The output of the event timer oscillator is the current in transistor 524 and is provided over line 409 to the event timer logic 400.

Figure 6:
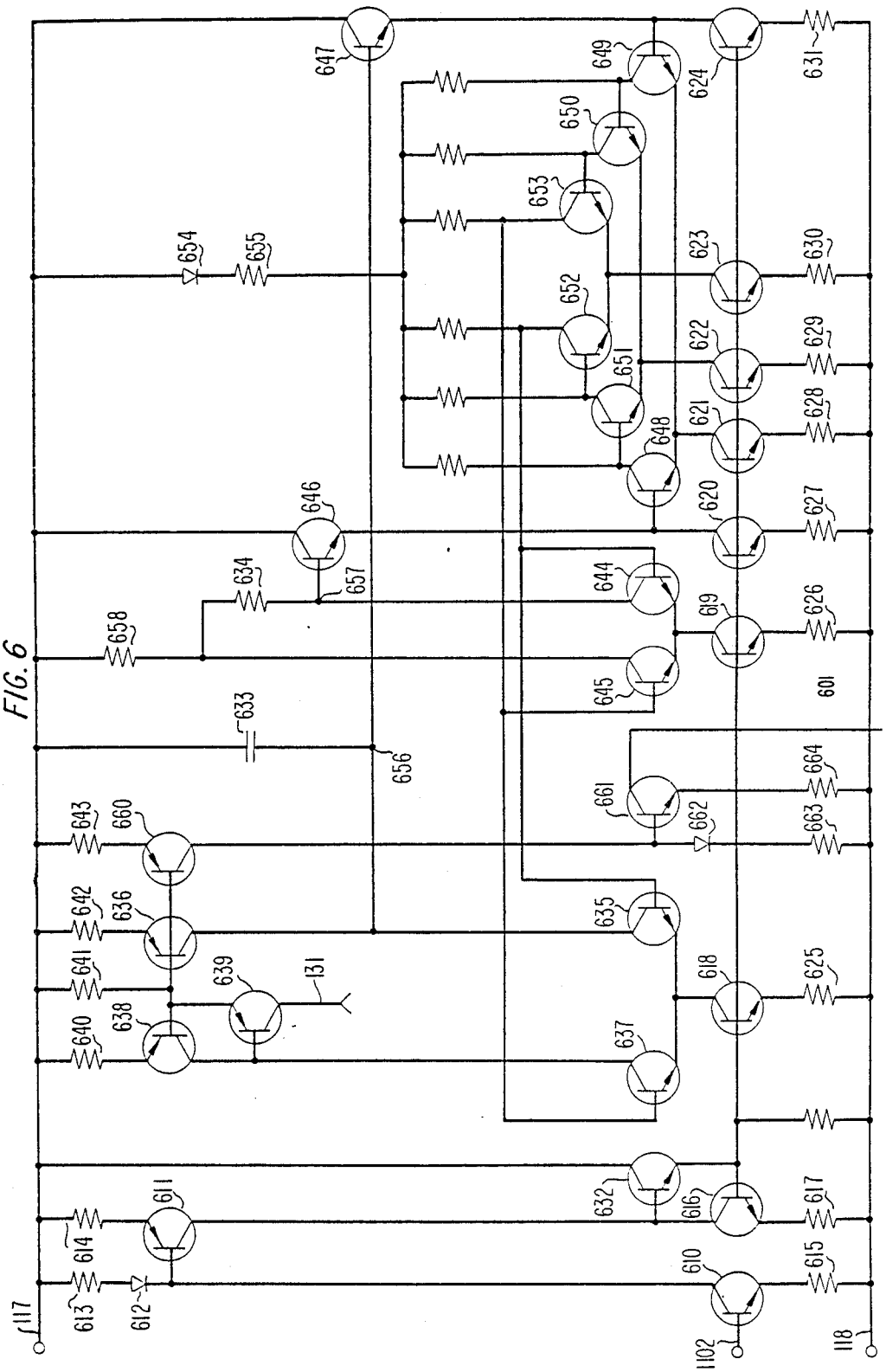
FIG. 6 is a detailed schematic of the precision oscillator circuitry employed in this invention.

The precision oscillator of FIG. 6 provides the reference frequency for the high and low frequency synthesizer logics 700 and 800. This oscillator operates on the same principle as the event timer oscillator 500 of FIG. 5 in that a capacitor therein is linearly charged and discharged with constant current sources connected in a complementary configuration. Two reference voltages determine the end points of the capacitor slew, and in condition with the capacitor set the period of the oscillation. The difference in the two reference voltages is fixed by a third constant current through a fixed resistor. The third current is proportional to the two other currents.

The precision oscillator is activated for the dial mode and is powered on by the dial supply 1100. As soon as an input voltage of sufficient magnitude is applied to transistor 610 over line 1102, transistor 610 turns on and the current source, comprising transistor 611, diode 612, and resistors 613 and 614 is activated. Resistor 615 establishes a reference current based on the level of the voltage on line 1102. Transistor 616 and resistor 617 sets up a current mirror section comprising transistors 618 through 624 and respectively associated resistors 625 through 630. Transistor 632 is used as a helper transistor to aid in supplying the base drive for this current mirror.

Capacitor 633 and resistor 634 form the basic timing elements for the precision oscillator. Transistor 635 forms the current source that discharges capacitor 633 and transistor 636 forms the current source that charges the capacitor 633. A comparator comprising transistors 646 through 653 compares the capacitor voltage with a bilevel reference voltage formed by a current flowing through resistors 658 and 634 and transistors 644 and 619 for the lower voltage reference level, and through resistor 658 and transistors 645 and 619 for the upper voltage reference level. When the capacitor 633 is discharging, transistor 635 is on and transistor 637 is off. The current mirror, comprising transistors 638, 639, 660, and 636 and resistors 640, 641, 642, and 643 is also off. Transistor 644 is on and transistor 645 is off, setting the capacitor discharge voltage lower reference level which is applied to the comparator input represented by the base of transistor 646. The capacitor discharge voltage is applied to the other comparator input which is the base of transistor 647.

The comparator has three differential gain stages. The input stage comprises transistors 646, 647, 648, and 649. Configured with two emitter follower transistors, this stage provides both a level shift and minimizes the loading of the comparator inputs on the reference voltage and the capacitor voltage. Transistors 650 and 651 form an intermediate gain stage while transistors 652 and 653 form the final gain stage and output stage of the comparator. Diode 654 and resistor 655 form a level shifting function so that the outputs of the comparator are of the proper level to control transistors 635, 637, 644, and 645, and avoid driving any of the transistors that are on into saturation.

When transistor 635 discharges the capacitor voltage at node 656 to below the lower voltage reference level at node 657, transistors 647 and 649 start to turn off and transistors 646 and 648 start to turn on. This, in turn, causes transistor 650 to turn on and transistor 651 to turn off. Transistor 653 also turns off and transistor 652 turns on. When transistor 652 turns on, it turns off transistors 635 and 644, while transistors 637 and 645 turn on because transistor 653 turns off. Thus, the level at node 657 immediately rises to the upper voltage reference level and transistor 636 starts supplying current for charging the capacitor 633. When the voltage on node 656 is higher than that on node 657, the comparator action is reversed to turn on transistors 635 and 644 while turning off transistors 637 and 645. The capacitor 633 starts discharging and the oscillation is repeated.

Transistors 660 and 661, diode 662, and resistors 643, 663, and 664 are used to derive a clock signal for the synthesizer logics 700 and 800. When transistor 635 is on, transistor 660 is off and the current mirror formed by transistor 661 and diode 662 does not sink current. When transistor 635 is off, transistors 636, 637, 638, and 660 are on. Transistor 660 then provides a current which is amplified by the current mirror comprising transistor 661 and diode 662 connecting the lead 601 to the synthesizers.

Figure 7:
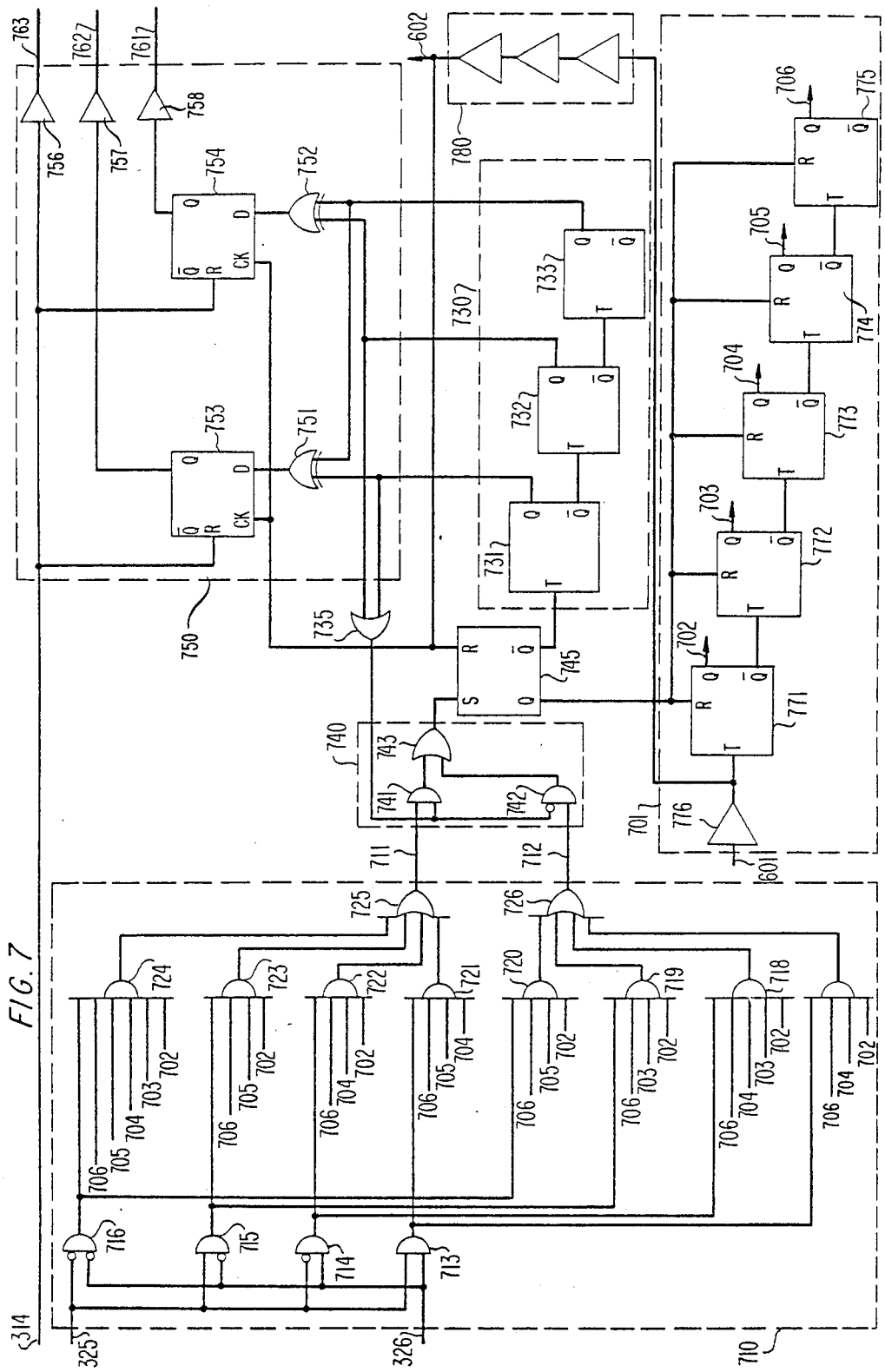
FIG. 7 is a detailed schematic of the low-frequency synthesizer logic circuitry employed in this invention.
Figure 8:
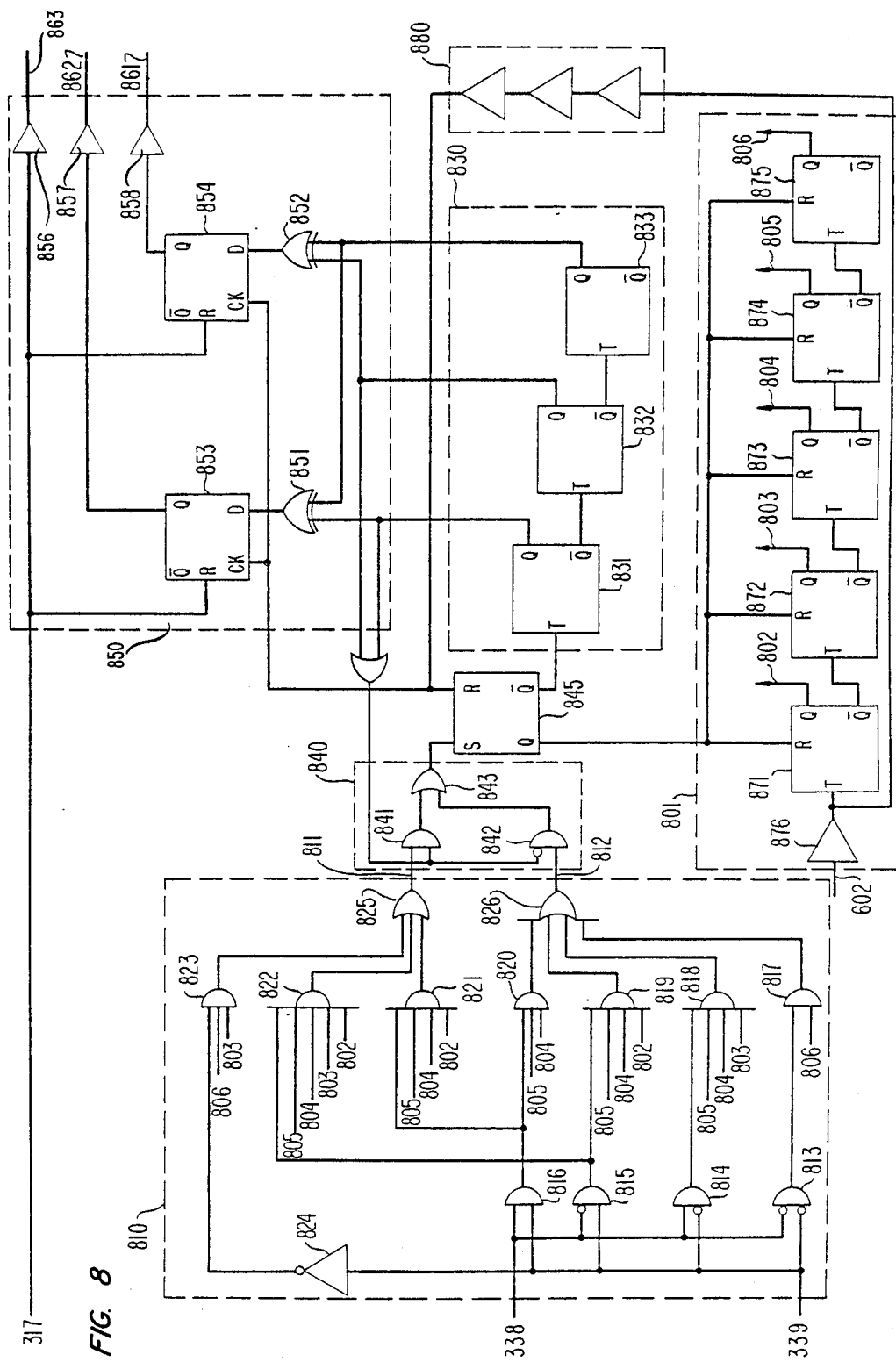
FIG. 8 is a detailed schematic of the high-frequency synthesizer logic circuitry employed in this invention.

Referring now to FIGS. 7 and 8, there is shown the detail circuitry of the low group frequency synthesizer logic 700 and the high group frequency synthesizer logic 800, respectively. Each of these frequency synthesizer logics count down the periods from the precision oscillator 600 and produce a binary signal for a digital-to-analog converter 1000.

Telephone tone signaling involves the simultaneous transmittal of two signals, one from a group of four frequencies below 1,000 Hz and one from a group of four frequencies above 1,000 Hz. The frequency of the tone signals in the two groups are:

| Low Group | High Group |
| --- | --- |
| 697 Hz | 1209 Hz |
| 770 Hz | 1336 Hz |
| 852 Hz | 1477 Hz |
| 941 Hz | 1633 Hz |

Figure 9:
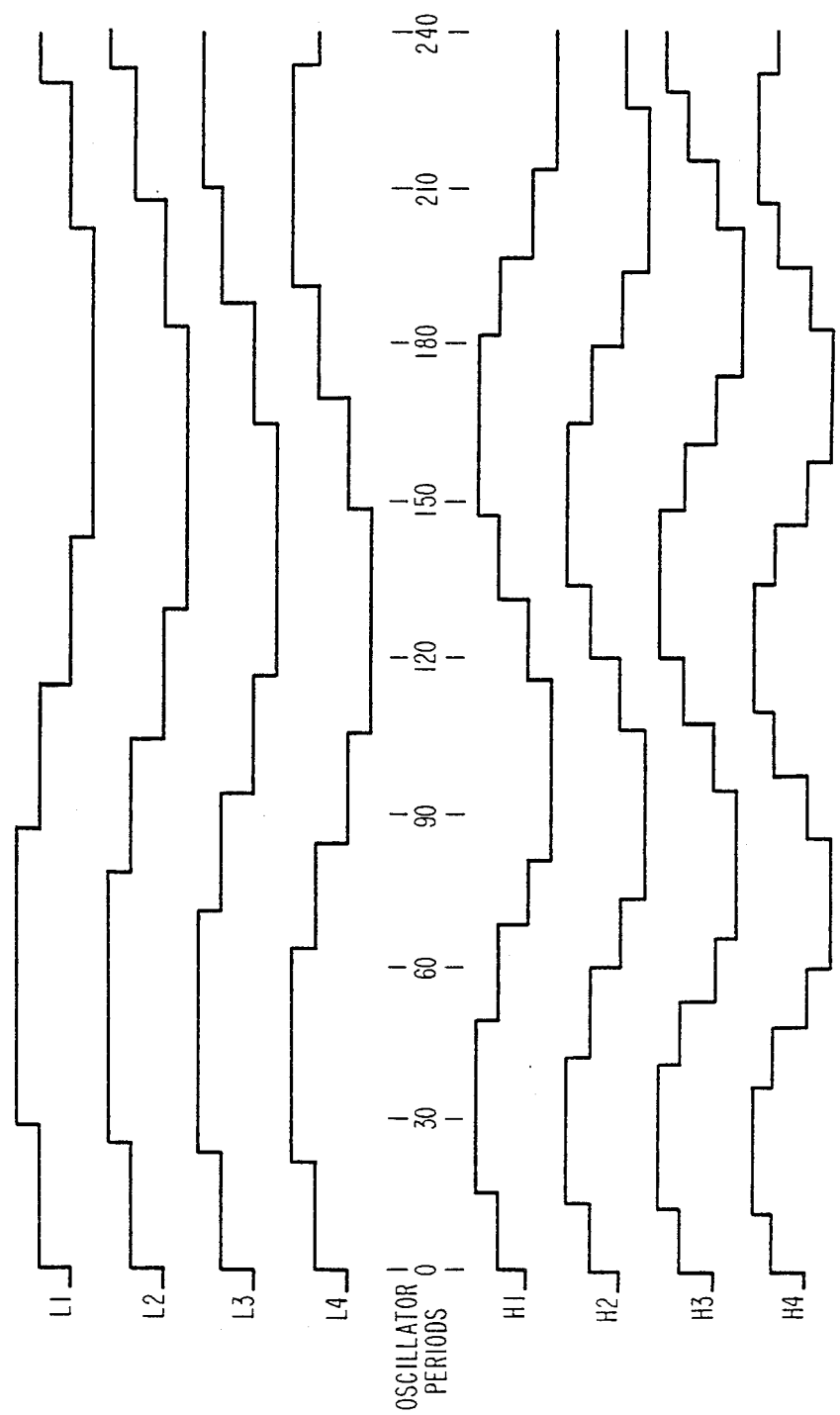
FIG. 9 illustrates the synthesized waveforms and their relationship to the oscillator periods.

To assist in understanding the operation of the synthesizer logics and their role in producing these low and high group tone signals, reference is also made to FIG. 9 which shows the synthesized waveform outputs of the digital-to-analog converter 1000 as a function of period counts of the precision oscillator 600. L1 through L4 represent the low group tone signals in increasing order of frequencies. Similarly, H1 through H4 represent the high group tone signals. A four-level synthesized waveform is desirable in order to minimize the harmonic filtering requirement of the tone signals. From an inspection of the low and high group tone signals, it is seen that the frequency of the lowest tone signal generated is less than half of the frequency of the two highest tone signals generated. It is desirable that the filtering of the harmonics of the lowest tone signal should not affect the fundamental of the higher frequencies of tone signals. Thus, the second harmonic of the synthesized lowest tone signal must be very small as synthesized. To this end, all even harmonics are small if the synthesized waveform is an even function, i.e., if the second half of the waveform is the mirror image of the first half of the waveform. If a third level with the appropriate time relationship and magnitude is added in the middle of the even function waveform producing a trilevel signal, the third harmonic is also eliminated. Similarly, by adding a fourth level and producing a waveform such as seen in FIG. 9, the fifth harmonic is also eliminated. Thus, the synthesizer design simplifies the harmonic filtering requirements.

In the generation of the binary data by the synthesizer logics of FIGS. 7 and 8, each waveform interval is divided into eight subintervals. Ideally, these intervals would be exactly one-eighth of the total period for reducing the indicated harmonics. This accuracy requires a fairly high frequency reference oscillator with a large number of gates in the count-down logic to obtain these intervals. It was empirically shown, however, during the designing of this generator that such an ideal waveform is not necessary. Thus, some of the waveforms used in the generator and shown in FIG. 9 have subintervals that are not exact multiples of eight and some low order harmonics are produced thereby. Overall distortion, however, is greatly reduced while keeping the reference frequency low and avoiding a large number of current-consuming gates in the count-down logic. The circuit complexity of the synthesizer logics 700 and 800 and the digital-to-analog converter 1000 is thus kept to a minimum level.

Since the number of reference oscillator periods making up a subinterval is not divisible by eight at the required frequency for each of the tone signals, two subinterval lengths, count K1 and count K2, comprising counts of the reference oscillator period are assigned for each tone signal. Count K2 is chosen to be equal to most nearly equal to an eighth subinterval.

As seen in FIG. 7, a five-bit period counter 701 comprising toggle flip-flop gates 771, 772, 773, 774, and 775 counts the number of oscillator periods coupled from the precision oscillator 600 over line 601 and through buffer 776. The count information is coupled from the period counter 701 over lines 702 through 706, to a count detector 710 which provides a K1 or K2 output signal after either K1 or K2 counts of oscillator periods are registered in the period counter 701. Also, coupled to the count detector circuit 710 over lines 325 and 326 is the low group tone signal information which determines the number of oscillator periods in each K1 and K2 count for the four tone signals in the low group section. AND gates 713 through 716 decode this binary signal and couple it to one of the inputs of AND gates 717 through 724. The other inputs of these gates receive the count information from the period counter 701. The outputs of AND gates 721 through 724 are combined in OR gate 725 producing a K1 output signal over line 711. The outputs of AND gates 717 through 720 are combined in OR gate 726 producing a K2 output signal over line 712.

Controlled by an output state counter 730 is a count selector 740, comprising AND gates 741 and 742 and OR gate 743, which accepts as its input either the K1 or K2 interval count. Once that interval has been counted as indicated by the count detector 710, providing a high output on either line 711 or 712, the count selector 740 sets R-S latch 745 which, in turn, resets the gates in the period counter 701. The R-S latch 745 also provides a signal to the output state counter 730. This three-bit binary counter, comprising gates 731, 732, and 733, keeps track of which subinterval is being counted and provides a signal through NOR gate 735 back to the count selector 740 after every third interval count. This counter also provides a signal to a waveshape encoding logic 750 which comprises exclusive OR gates 751 and 752, flip-flops 753 and 754, and buffer gates 756, 757, and 758. The waveshape encoding logic 750 utilizes the outputs from the output state counter 730 to encode the two-bit binary signal that is coupled to the digital-to-analog converter 1000 over the lines 761 and 762 along with the multibutton push information on line 763.

The low-frequency synthesizer logic 700 operates in the following manner. If there is a single row output signal from the keypad 100, the kill signal over the line 314 will be at a logic zero and the output state counter 730 will be in one of its eight possible states. By way of example, assume the state counter 730 is in state 110 (gate 733 at logic one, gate 732 at logic one, and gate 731 at logic zero). The outputs 762 and 761 will be one and zero, respectively, causing the digital-to-analog converter 1000 to generate the second one of four output level steps. Additionally, the count selector 740 will be coupling the K2 count to the R-S latch 745. Before the period counter 701 reaches a count of K2, the R-S latch 745 will be in the reset state, i.e., output Q at a logic zero. This is caused by the oscillator signal which is coupled through the gate delay 780 over line 602 to the R-S latch 745. When count K2 is reached, the R-S latch 745 is set causing the period counter 701 to reset and the output state counter 730 to toggle to the state 111. Since the period counter 701 clocks on the falling edge of the oscillator signal coupled over the line 601, the R-S latch 745 remains in the set state for one-half of the period of the precision oscillator less any delay time through the period counter 701, count detector 710, and count selector 740.

After the precision oscillator signal on line 602 has reset the R-S latch 745, the period counter 701 then counts out another K2 count for the next subinterval. The R-S latch 745 is again set and, in turn, resets the period counter 701 and toggles the output state counter 730 to subinterval 000. In this subinterval, the output state counter 730 is toggled and a K1 count is counted instead of K2 before the period counter 701 is reset. The next three consecutive counts are those of K2. As the output state counter 730 reaches a subinterval count of 100, a K1 count is generated once again as the subinterval count. K2 interval counts are resumed for the remaining counts up to subinterval 111. Thus, the process continues repetitively generating the appropriate signals required by the digital-to-analog converter 1000.

Any change in the keypad encoded signal on lines 325 and 326 is immediately reflected in the number of K1 and K2 counts. If the keypad logic raises the signal on line 314 to a logic one at any time, the waveshape encoding logic 750 indicates a multiple input. The counting logic in the low-frequency synthesizer, however, continues on as if tone signals were being generated. The net effect is that removal of the multiple input or change in the selected input results in the generation of the tone signal indicated by the keypad 100 with no validation times involved. This greatly simplifies the logic and still allows for adequate protection against multiple inputs as well as the ability of the generator to follow the user's commands given by the keypad 100.

The high-frequency synthesizer logic 800 in FIG. 8 is operationally identical to the low-frequency synthesizer logic 700 described in FIG. 7. A count detector 810 therein comprises AND gates 813 through 823, an inverter 824, and OR gates 825 and 826. This detector provides over lines 811 and 812, respectively, a K1 and a K2 count signal to a count selector 840 which contains AND gates 841 and 842 and OR gate 843. A five-bit period counter 801 containing gates 871 through 875 counts the number of oscillator periods coupled over line 602 to a driver 876 and provides outputs over lines 802 through 806. An output state counter 830 containing gates 831, 832, and 833 receives an output from an R-S latch 845 and keeps track of which subinterval is being counted. A six-gate delay 880 provides the proper synchronization. A waveshape encoding logic 850 with exclusive OR gates 851 and 852, latches 853 and 854, and drivers 856, 857, and 858 utilizes the outputs from the output state counter 830 to encode the two-bit binary signal that is coupled to the digital-to-analog converter 1000 over lines 861 and 862 along with the multibutton push information on line 863.

Figure 10:
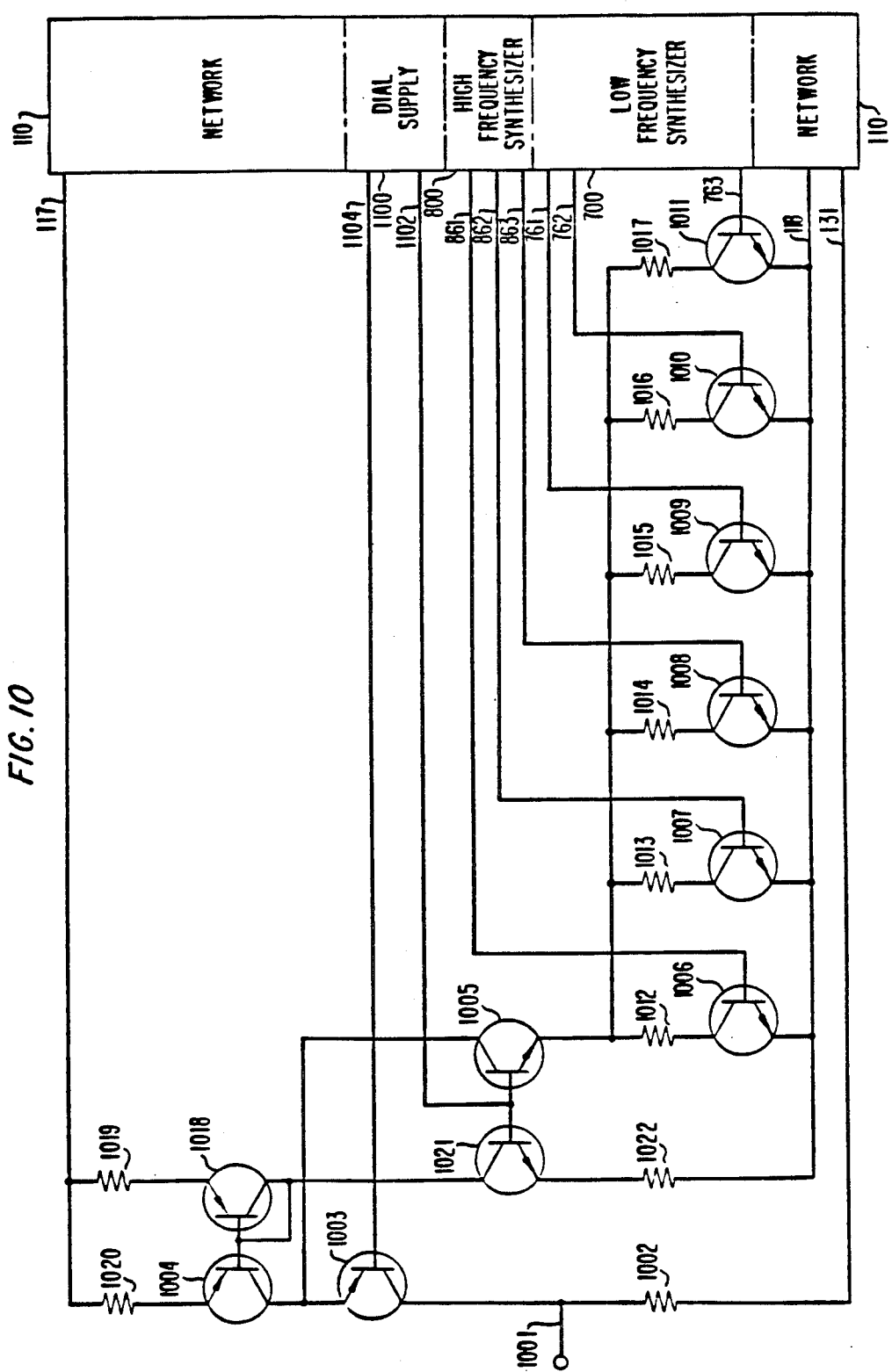
FIG. 10 is a detailed schematic of the digital-to-analog converter circuit employed in this invention.

The digital-to-analog converter 1000 as seen in FIG. 10 converts each of the digital outputs from the low and high frequency synthesizer logics 700 and 800 to the four-level sine wave approximations of FIG. 9 which are amplitude controlled. The input logic levels which define the tone frequencies are provided over lines 761, 762, 861, and 862. DC compensation signals for a multibutton push condition is provided over lines 763 and 863. The analog output voltage of the converter on line 1001 is the voltage across resistor 1002 and is equal to the product of the collector current of transistor 1003, which serves as a current summer, and the resistance of resistor 1002. The collector current of transistor 1003 is, in turn, approximately equal to the collector current of transistor 1004 minus a signal current that is diverted through the collector of transistor 1005.

The level of the collector current of transistor 1005 is determined by which of the transistors 1006 through 1011 are activated with the selection being controlled by the outputs of the frequency synthesizer logics 700 and 800. Current-controlling resistors 1012 through 1017 are respectively associated with transistors 1006 through 1011 and limit the current flow therethrough. The voltage at the emitter of transistor 1005 has a low temperature and supply voltage coefficient. This voltage is much larger than the voltage at the collectors of transistors 1006 through 1011 when activated. The output voltage level developed across resistor 1002 is controlled by the dc current from transistor 1004 and the signal current drawn off through transistor 1005. Transistor 1018 and resistor 1019 combine with transistor 1004 and resistor 1020 to form a current mirror. The current in this mirror is held constant by the current in transistor 1021 whose base is tied to a reference voltage provided over line 1102 from the dial supply. The emitter of transistor 1021 is connected through a current-limiting series resistor 1022 to common over line 118.

With the activation of transistors 1006 through 1011, the associated parallel resistors 1012 through 1017 are switched into the circuit changing the resistance path to common of transistor 1005 and thus its emitter current. With transistor 1005 having an alpha nearly equal to unity, practically the same current flows in its collector. By design this current is always less than the collector current of transistor 1004 so that the emitter current of transistor 1003 is always correctly sensed and equal to the difference.

Diverting a signal current from a dc current achieves certain circuit benefits: First, modulation of the power supply current is avoided since the total current demand remains the same by being steered by the digital-to-analog converter rather than by being switched. Second, the circuit operates at very low currents to reduce the power supply drain. Last, the switching transistors used to control the emitter current of transistor 1005 are allowed to have very low drive currents (on the order of 3 microamperes).

Figure 11:
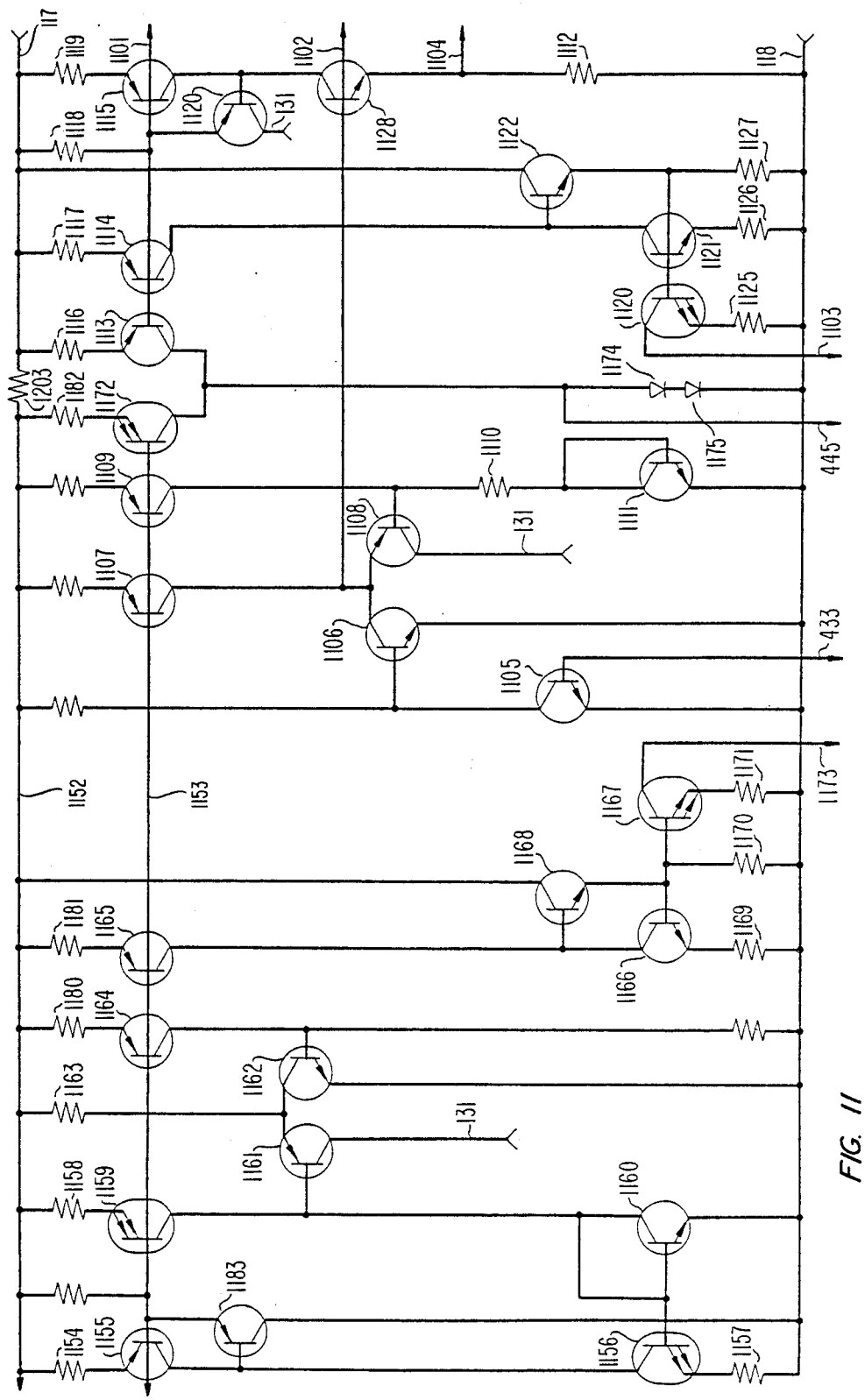
FIG. 11 is a detailed schematic of both the speech and dial power supply circuitry employed in this invention.
Figure 12:
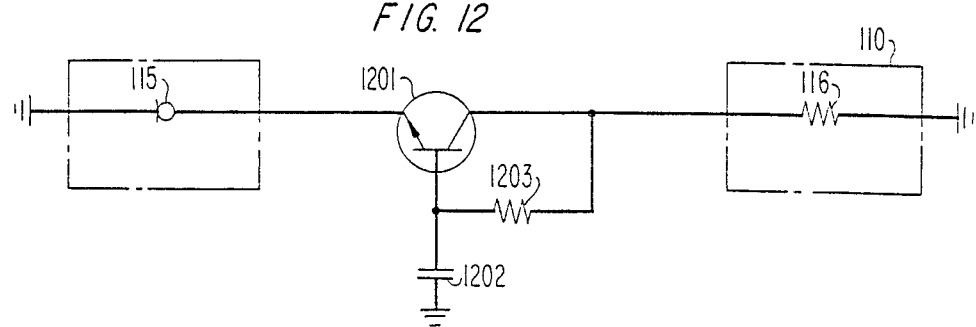
FIG. 12 is a circuit diagram of the basic transmitter switch with gain circuit.

The multifrequency generator operates over a rather wide range of voltage, yet contains precision circuitry to maintain the frequency and amplitude of the output tones at a constant level. Referring to FIG. 11, there is shown a dial and speech supply for powering the multifrequency generator while in the speech and dial modes. The speech supply section provides operating power for the generator whenever an associated telephone is off-hook. The dial supply section provides operating power whenever the generator is in the dial mode. Input power is provided to both sections over the input lines 117 and 118. In the speech supply section a first current flows through resistor 1154, transisors 1155 and 1156, and resistor 1157 causing a second current twice as large as the first current to flow through resistor 1158, transistors 1159 and 1160. Because of the current doubling that is obtained from transistors 1155 and 1159, and the emitter ratio of transistor 1156 being twice that of transistor 1160, a fixed voltage is provided on the emitter of transistor 1156 independent of possible current variations. Thus a current mirror including transistors 1164, 1165, and 1172 and respectively associated resistors 1180, 1181, and 1182, is activated. Transistor 1183 serves as a helper for this current mirror. The value of resistor 1157 is selected to determine the current value.

The circuit comprising transistors 1161 and 1162 ensures that the speech supply section will be powered up in the right state when a user goes off-hook on the telephone line. This is necessary since the supply has two possible states, one providing zero current and the other providing a defined current. A path for a trickle current is provided from the line 1152 through resistor 1163 and transistor 1161 causing it to conduct and force the speech supply section away from the zero current state. Once the state providing the defined current is reached, transistors 1155, 1159, and 1164 are all on. Transistor 1164 turning on causes transistor 1161 to turn off. This is to avoid having an error current from transistor 1161 when the speech supply section is in the correct state. Current mirror transistor 1165 provides the reference current for a current mirror section comprising transistors 1166, 1167 and 1168, and resistors 1169, 1170, and 1171. This current mirror provides a reference current to the keypad interface 200 and the event timer logic 400.

While in the speech mode, transistor 1172 in the speech supply section provides sufficient current to the line 445 to keep the event timer logic 400 and keypad interface 200 active. A current path from line 445 to 1173 exists through the event timer logic 400 and the keypad interface 200. The current provided by transistor 1172 is designed to be greater than the current received by transistor 1167. The difference current flows through diodes 1174 and 1175. Also, in the speech mode the input over line 433 to transistor 1105 is zero and transistor 1105 is off. Thus, transistor 1106 is on causing the voltage on line 1102 to be at a low level.

In the dial mode the dial supply section is activated. Transistor 1105 is turned on pulling the base of transistor 1106 to a low level and turning it off. The voltage on line 1102 goes to a high level providing a bandgap type voltage reference signal for the digital-to-analog converter 1000 and the precision oscillator 600. This reference signal is provided by transistors 1109 and 1111, resistor 1110, and works as follows: the voltage drop across resistor 1157 is repeated with gain across resistor 1110. (The currents are equal in transistors 1109 and 1155 although the resistor values are different.) The positive temperature coefficient (TC) of $\Delta T/T$, or about 3000 ppm at 25 degrees C., is also repeated. This positive TC is balanced with the negative TC of diode-connected-transistor 1111 to give a total TC approaching zero. Thus, the transistors 1109 and 1111 and resistor 1110 are configured such that temperature variations are offsetting and the voltage on the line 1102 is precisely maintained within one emitter-base junction voltage above that of the base of transistor 1108.

Transistor 1128 also turns on when the voltage on line 1102 goes to a high level. The current in resistor 1112 sets up currents in the current mirror section comprising transistors 1113 through 1115 and resistors 1116 through 1119. Transistor 1120 serves as a helper transistor. Transistor 1113 provides additional current to the line 445 when the generator is in the dial mode. Transistor 1114 activates current mirror section comprising transistor 1120 and 1121 and resistors 1125, 1126 and 1127. Transistor 1122 serves as a helper for this current mirror. The collector of transistor 1120 is connected to the low and high frequency synthesizer logics 700 and 800 on line 1103 and provides an activation current thereto. A voltage over line 1104 is provided to the digital-to-analog converter 1000 and line 1101 provides a voltage to a filter and line driver 1600.

The common switch circuit of the electronically-switched multifrequency generator, shown diagrammatically in FIG. 1 as block 1200, is illustrated in detail in FIGS. 12, 13, 14, and 15. There is shown a means of adding gain to the transmitter 115 and receiver 120 and for improving the impedance matching through use of active devices. As conceptually shown in FIG. 12, the transmitter common switch circuit section is interconnected between the transmitter 115 and the terminating impedance 116 in network 110 through a common base-connected transistor 1201. A voltage gain is obtained and the common base current gain of transistor 1201 is almost unity. Capacitor 1202 provides an ac ground to the base of transistor 1201, thereby making the circuit nonoscillating regardless of the phase and magnitude value of the load or network impedance. Resistor 1203 provides a dc bias to the base of transistor 1201 and represents a parallel load on the network terminating impedance 116.

Figure 13:
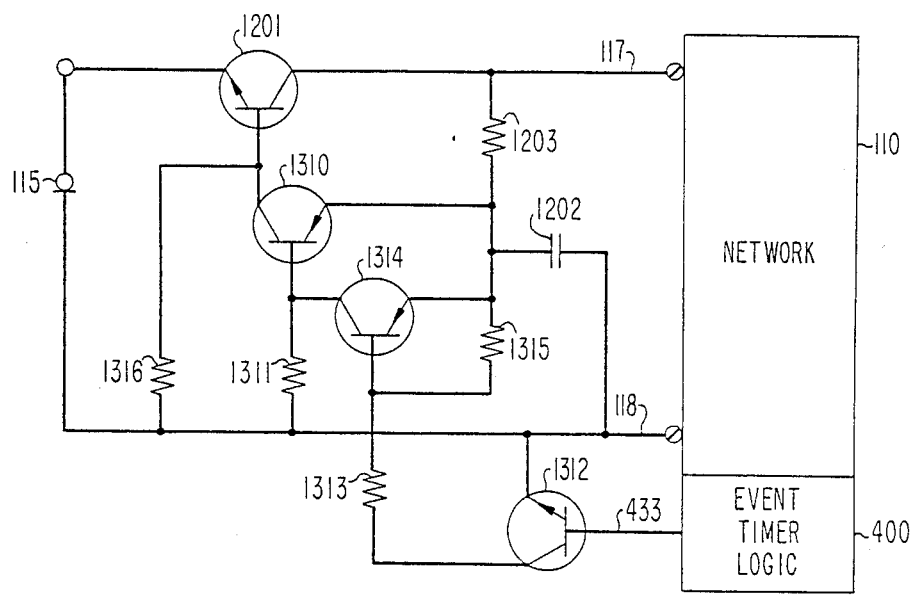
FIG. 13 is a detailed schematic of the transmitter switch with gain circuit.

In FIG. 13, the transmitter common switch circuit section is illustrated in detail. As discussed above, transistor 1201 provides the common base gain stage. In order to mute the transmitter, the transistor switch 1310 is added between the base of transistor 1201 and capacitor 1202. This transistor switch is normally biased on by resistor 1311. In muting the transmitter 115, the event timer logic 400 supplies base driver over line 433 to transistor 1312 which saturates and, in turn, provides drive current through resistor 1313 causing transistor 1314 to also saturate. With transistor 1314 saturated, transistor 1310 is turned off with its base emitter voltage being much less than 0.6 volts. With no base current supply, transistor 1201 also turns off. Resistors 1315 and 1316 are incorporated into the circuit to minimize the effect of collector leakage.

Figure 14:
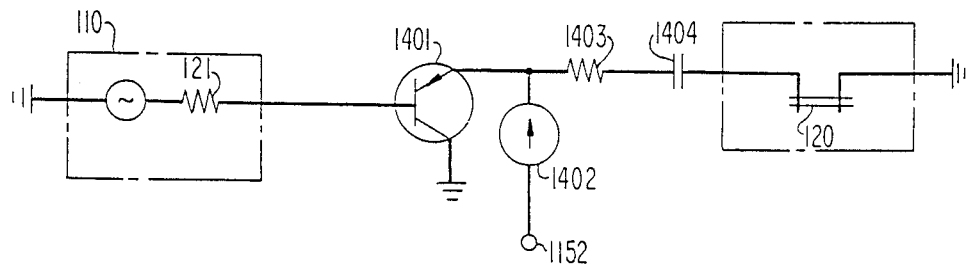
FIG. 14 is a circuit diagram of the basic receiver switch with gain circuit.

As shown in FIG. 14, the concept of receive gain involves interconnecting an active device, such as a transistor 1401 connected in a common collector configuration, between the receiver 120 and the source impedance 121 of the network 110. Associated with the transistor 1401 are an emitter current source 1402 providing a reference bias, the resistor 1403 which serves to reduce the effective gain and obtain the desired receive level, and a capacitor 1404 which couples the signal to the receiver 120. The voltage gain in the common collector circuit is almost unity and the current gain is approximately doubled. The signal gain, therefore, amounts to almost a factor of 2.

Figure 15:
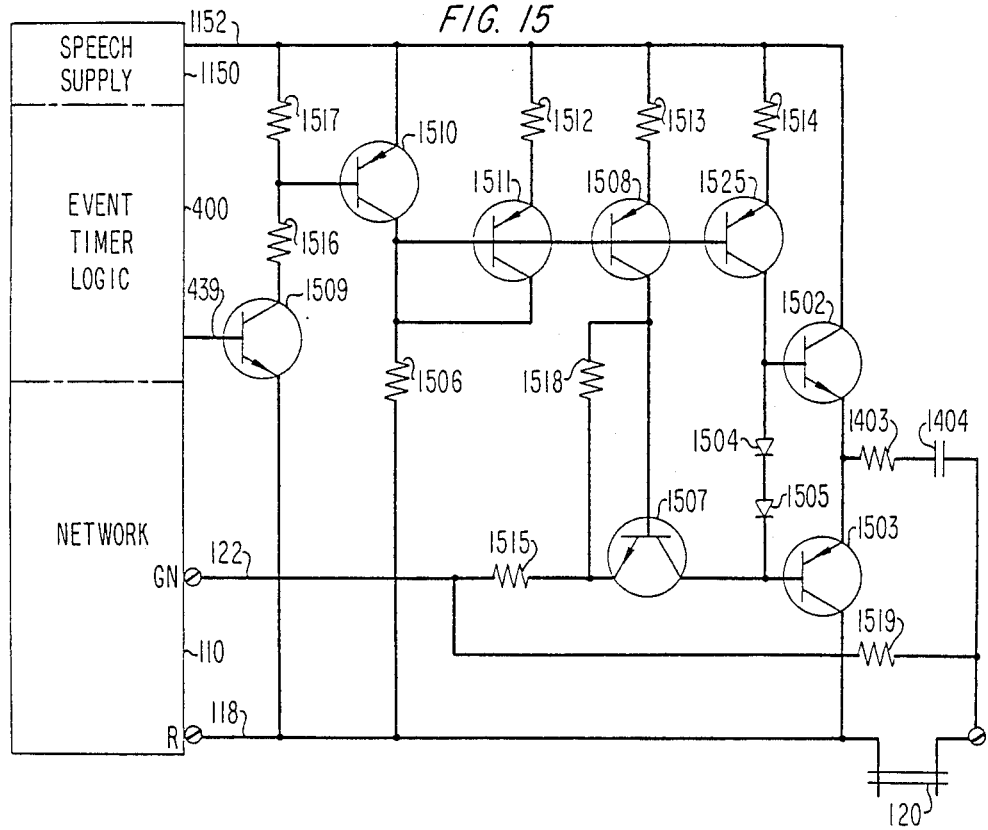
FIG. 15 is a detailed schematic of the receiver switch with gain circuit.

FIG. 15 shows the receiver common switch circuit section illustrated in detail. To provide more efficient use of the available power and to provide muting for the receiver without generating large transients therein, the following additional concepts are incorporated in the basic circuit depicted in FIG. 14. The gain stage, consisting of transistors 1502 and 1503 and diodes 1504 and 1505, is a class AB stage. It is designed with the emitter area of transistor 1502 being twice that of the cathode area of diode 1504 and the emitter area of transistor 1503 being twice that of the cathode area of diode 1505. Because of this area ratio, the bias current required for the diodes 1504 and 1505 can be half of that required for these output transistors 1502 and 1503. Bias current for this gain stage is established by the current flowing in resistor 1506 and being repeated in transistor 1525. A saturated switch in the signal path, transistor 1507 couples the receive signal appearing at the GN-R port of the network 110 on lines 122 and 118 to the gain stage input. Transistor 1507 is forced into saturation by the current from transistor 1508.

The receiver common switch current section is muted in the dial mode by the event timer logic 400 turning on transistor 1509 and thus transistor 1510 into a saturated condition. With transistor 1510 saturated, the current repeater string comprising transistors 1511, 1508, and 1525 and resistors 1512, 1513, and 1514, turns off. Transistor 1507, in turn, turns off opening the signal path. The gain stage is turned off also to prevent coupling capacitor 1404 from being charged or discharged during the mute time. Resistors 1515 and 1403 reduce the effective gain to obtain the desired receive level. Resistor 1516 limits the base drive to transistor 1510 when transistor 1509 is saturated, while resistors 1517 and 1518 ensure that leakage currents will not inadvertently turn on transistors 1510 or 1507 when they are supposed to be turned off.

In the dial mode, a reduced signal level is coupled to the receiver through resistor 1519. To properly mute the receiver, both the gain stage and the switch must be turned off. If the switch represented by transistor 1507 were not present, for example, and the gain stage was turned off, then the receiver 120 would be muted but the negative swings of the signal from the line 122 would tend to discharge capacitor 1404 and result in a large charging transient when the gain stage is turned on at the end of the button push causing an annoying click in the receiver 120. Another example of why the gain stage and the switch must both be turned off is shown by assuming transistor 1507 were turned off and not the gain stage. The capacitor 1404 would be charged from transistor 1525 through transistor 1502 until transistor 1402 finally saturates, resulting in a large discharge current when the button is released and transistor 1507 is turned on again. This also causes an annoying click in the receiver 120.

Low voltage level operation of this receiver common switch circuit section is possible. The section requires as little as 1.6 volts to be fully operational at room temperature and does not require the tone generating portion of the electronically-switched multifrquency generator to be active for it to be operational. This is of primary importance in those instances where multiple telephone sets are used and acceptable speech performance is needed but tone generation is not.

Figure 16:
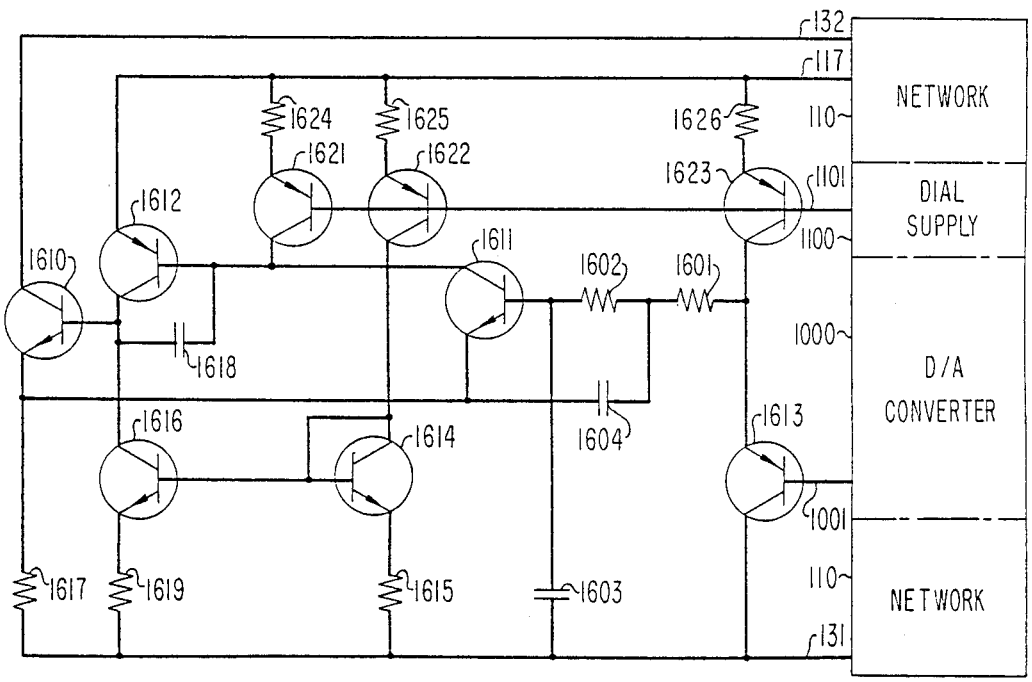
FIG. 16 is a detailed schematic of the amplifier and filter circuitry employed in this invention.

The amplifier and filter circuit shown in FIG. 16 removes the harmonics in the output signal received from the digital-to-analog converter 1000 and also amplifies this signal to a level suitable for transmitting over the telephone tip and ring lines. In order to minimize distortion and meet out-of-band signal requirements, a second order low pass Chebychev filter is used. The filter has a peak response at 1477 Hz and a 2.3 db ripple. That is, the response of the filter rises monotonically from its dc response until at 1477 Hz it is 2.3 db above the dc response. As previously indicated, through synthesis of the tone frequency signals into four discrete steps approximating a sine waveform, the first significant distortion occurs in the seventh harmonic. For the lowest tone frequency of 697 Hz, this frequency is 4879 Hz and the filter is providing at least 15 db of attenuation. The seventh harmonic of the higher tone frequencies is reduced even further. The filter comprises resistors 1601 and 1602, capacitor 1603 and 1604, and a unity gain amplifier, as will be explained below.

The unity gain amplifier portion of the amplifier and filter circuit 1600 is a voltage follower amplifier with an open loop gain on the order of 1000. Transistors 1610, 1611, and 1612 comprise this amplifier and provide a drive current to the network 110 and telephone line over line 132. A reference current is provided to the amplifier from the dial supply over the line 1101. To achieve optimum circuit performance, this reference current drives a current mirror section which comprises transistors 1621, 1622, and 1623 and resistors 1624, 1625, and 1626. Operating power for the amplifier and filter circuit is coupled over the line 117 to this current mirror section. Bias current for input transistor 1613 is provided by transistor 1623. Transistors 1614 and 1616 with resistors 1619 and 1615 from a current mirror to provide a bias current in transistor 1612 proportional to the current from transistor 1622.

Transistor 1610 serves a dual function by also providing a feedback voltage across resistor 1617 for the filter circuit. The emitter of transistor 1610 is connected to the emitter of transistor 1611 and through capacitor 1604 to the node connecting resistors 1601 and 1602. Controlled by this feedback loop, the ac voltage at the emitter of transistor 1610 almost equals the voltage at the base of transistor 1611. Also, the exponential difference properties of the base and emitter of transistor 1611 perform the subtraction function of negative feedback.

The voltage on the telephone lines is controlled by the impedance connected to the collector of transistor 1610. This impedance is a parallel combination of the tip ring line impedance, the passive network impedance, and the ac resistance of the biasing network from the dial supply 1100. A compensating capacitor 1618 controls the high frequency gain and, therefore, the stability of the amplifier. Because the compensating capacitor is across the second stage of gain, an effective one-pole amplifier response is obtained. Transistors 1621 and 1616 control the collector current in transistors 1611 and 1612, respectively. The current in transistor 1621 is chosen to be low to control the gain-bandwidth product of the amplifier and to keep the input bias current low. The current in transistor 1616 is high enough to maintain good frequency response in the second stage while still maintaining a reasonable quiescent current.

Although a specific embodiment of the invention has been shown and described, it will be understood that it is but illustrative and that various modifications may be made therein without departing from the scope and spirit of this invention as defined in the appended claims.

We claim:

1. A digital-to-analog converter comprising input circuit connections (861, 862, 761, 762) for receiving a plurality of binary input signals, and means responsive to the binary input signals for producing an analog output signal at an output circuit connection (1001), the magnitude of the analog output signal being representative of the binary input signals, characterized in that:

the converter includes a constant current generator (1004, 1018–1022) connected to a power source, the constant current generator comprising a current mirror with a first transistor (1018) and a second transistor (1004) and wherein a fixed constant current in the first transistor is repeated in the second transistor;

the means for producing the analog output signal is comprised of means for subtracting a source current reflective of the binary input signals from the current in the second transistor at a first current summer (1003), the amount subtracted being determined by the received binary input signals; and the converter provides a constant total current demand from the power source while receiving any one or combination of the plurality of binary input signals.

2. The digital-to-analog converter of claim 1 further characterized in that the output of the first current summer is connected through a resistive element (1002) to a second reference potential, and the analog output signal for the output circuit connection's being obtained solely from the voltage developed across the resistive element.

3. The digital-to-analog converter of claim 2 further characterized in that each one of a plurality of transistor switches (1006, 1007, 1009, 1010) is connected to a first side of one of a plurality of current controlling resistive elements (1012, 1013, 1015, 1016) and provides a low-resistance current path for the resistive elements upon receiving an associated binary input signal and a high resistance current path in the absence of the associated binary input signal, the input circuit connection being the control node of each one of the plurality of switches.

4. The digital-to-analog converter of claim 1 further characterized in that a first side of each one of a plurality of switches (1006, 1007, 1009, 1010) is commonly connected to a reference potential (118), and the second side of each one of the plurality of switches is respectively connected to a first side of one of a plurality of current controlling resistive elements (1012, 1013, 1015, 1016), the plurality of resistive elements being commonly connected to a first side of a second current summer (1005), the second side of the second current summer providing the source current for subtracting at the first current summer, and a common reference voltage being provided to the constant current generator and to the switched resistive elements through the second current summer.

5. The digital-to-analog converter of claim 4 further characterized in and including means (1008, 1011) connected to input circuit connections (763, 863) for substituting a dc level output signal equivalent in the absence of a binary input signal to the digital-to-analog converter for maintaining a constant average output level.

6. The digital-to-analog converter of claim 5 wherein the means for substituting a dc level output signal equivalent comprises at least one switch (1008) for providing a low-resistance current path for a current controlling resistive element (1014) upon receiving an activation signal from the associated input circuit connection and a high-resistance circuit path in the absence of the activation signal, the input circuit connection being the control node for the switch.

* * * * *

UNITED STATES PATENT AND TRADEMARK OFFICE
CERTIFICATE OF CORRECTION

PATENT NO. : 4,539,552

DATED : September 3, 1985

INVENTOR(S) : Paul C. Davis, Raymond G. Jackson, Joseph J. Nahas, Dale H. Nelson, DeWitt G. Ong, Brian A. Wittman It is certified that error appears in the above-identified patent and that said Letters Patent is hereby corrected as shown below:

In the heading, the inventors "Paul C. Davis, Raymond G. Jackson, Joseph J. Nahas, Dale H. Nelson, DeWitt G. Ong, Brian A. Wittman" should read --Paul C. Davis, Raymond G. Jackson, Joseph J. Nahas--.

Signed and Sealed this

Third Day of June 1986

[SEAL]

Attest:

DONALD J. QUIGG

Attesting Officer

Commissioner of Patents and Trademarks